UNITED STATES PATENT OFFICE.

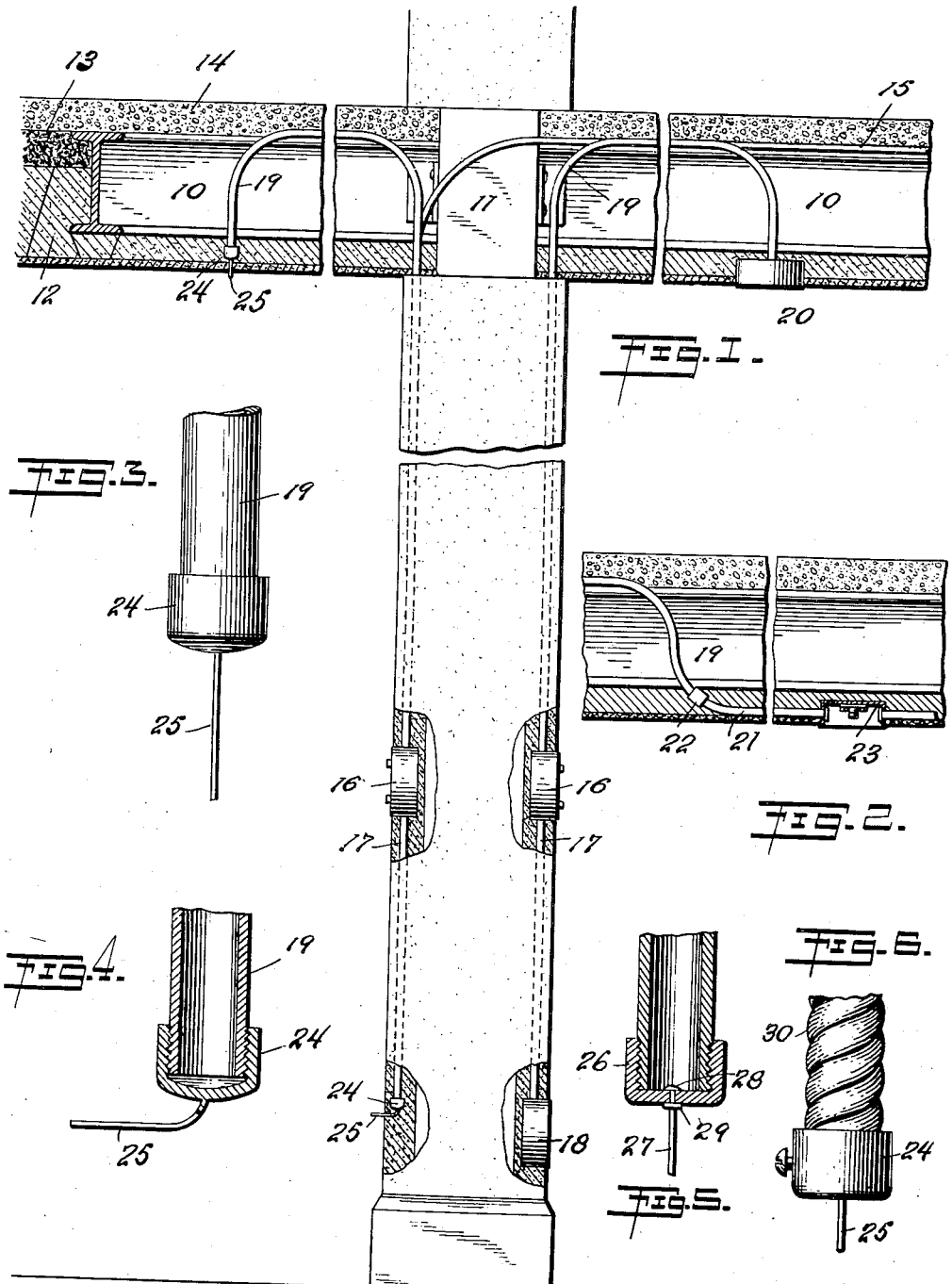
E. H. FAILE.
INSTALLATION OF ELECTRIC CONDUCTORS.
APPLICATION FILED APR. 25, 1910.
966,086.
Patented Aug. 2, 1910.

EDWARD HALL FAILE, OF NEW YORK, N. Y.

INSTALLATION OF ELECTRIC CONDUCTORS.

966,086.    Specification of Letters Patent.    Patented Aug. 2, 1910.

Application filed April 25, 1910. Serial No. 557,553.

*To all whom it may concern:*

Be it known that I, EDWARD HALL FAILE, a citizen of the United States, and a resident of the city of New York, borough of Manhattan, in the county and State of New York, have invented a new and Improved Installation of Electric Conductors, of which the following is a full, clear, and exact description.

In the constructing of buildings, it is common practice to embody within the walls, floors, partitions and columns, a system of conduits into which are later drawn electric wires for the lighting system of the building. Panel boxes or switch boards are located at convenient points in the building, for instance, one in the corridor of each floor and the conduits lead from these panel boxes to the various points at which it is intended that the lighting fixtures or plugs are to be located. Outlet boxes are placed at the terminals of the conduits, and the walls, ceilings, partitions, etc., are then plastered or otherwise covered to completely conceal the conduits and leave one face of each outlet box exposed. Considerable care is required in plastering around the outlet boxes to give the plaster a smooth and even appearance. In large office buildings, the placing of the outlet boxes is often largely a temporary matter. The outlet boxes are placed at spaced intervals along the ceiling or walls, but the partitions are frequently omitted until after the space has been rented, when the tenant is given the privilege of having the partitions spaced to suit his convenience or the character of his business. Thus it often happens that after the partitions are installed some rooms will be without outlet boxes or the outlet boxes are at inconvenient or undesirable points. It is then necessary to break away the plaster, remove the outlet box, place an extension on the conduit, and install a new outlet box. Furthermore, certain outlet boxes are often found unnecessary and are closed by a large plate or cover which is unsightly. My invention is also particularly useful in the construction of residences, where it is desired to install the conduits for electric wiring, but in which no electric conductors are to be put in until some future date.

The object of my invention is to avoid the expense and time incidental to the placing of outlet boxes, which must later be torn out or which are never to be used.

In carrying out my invention I close the end of the conduit, support an indicator at the closed end, and apply a wall covering over the end of the conduit, the closure and a portion of the indicator, so that the exposed portion of the indicator is of small cross sectional area and comparatively inconspicuous. The cost of the closure and indicator is less than that of an outlet box, and the time required in plastering around the indicator or fitting other wall covering in place, is less than that required in the case of an outlet box. Thus, the original installation is far less expensive. After it has been definitely determined where the outlet fixtures or blocks are to be located, that is, after the space has been rented and the partitions placed, the plaster may be broken away and outlet boxes placed at the desired points in the same manner as is common at the present time. If it is not desired to install outlet boxes at the ends of all of the conduits, the exposed portion of the indicator may be cut away flush with the surface of the plaster by means of a pair of nippers, and the remaining portion of the indicator will be inconspicuous but discoverable.

Reference is to be had to the accompanying drawings, forming a part of this specification, in which similar characters of reference indicate corresponding parts in all the figures, and in which—

Figure 1 is a vertical section through a portion of flooring supported by a column, a portion of the latter being broken away; Fig. 2 is a section similar to the right-hand portion of Fig. 1 but showing the outlet boxes shifted to a new position; Fig. 3 is a side elevation of the terminal portion of a conduit with my improved device applied thereto; Fig. 4 is a longitudinal section through the parts shown in Fig. 3, the indicator being illustrated as bent at an angle to the general direction of the conduit; Fig. 5 is a longitudinal section through a slightly different form in which the indicator and closure are formed of separate pieces of material secured together; and Fig. 6 is a side elevation showing my improved device applied to a flexible conduit.

My improvements may be employed in the constructing of any type of building, and may be embodied in various different systems of electric installation. Merely as an example, I have illustrated a common type of fireproof construction, in which the floors have I-beams 10 connected at their ends to the metal posts 11 in the columns. Between parallel I-beams are tile or terra-cotta blocks 12, supported by the lower flanges of the I-beams and forming a series of flat arches. A mixture 13 of cinder concrete fills the space above the tiles to the level of the upper surface of the I-beams and a flooring of concrete 14 covers the tops of the I-beams and the cinder concrete 13. The steel work of the columns is encircled by blocks of tile, terra cotta, or other fire-proof material and the exposed surfaces of the ceiling, columns and walls are covered with plaster.

During the construction of the building, conduits 15 are installed which lead from panel boxes or switchboards to small switch boxes 16, disposed on the walls or columns at such height and in such position that the electric lights may be readily turned on or off. From these switch boxes 16 conduits lead to the points at which it is probable that the lighting fixtures will be placed. At the right-hand side of Fig. 1, I have illustrated a conduit 17 leading downwardly from the switch box 16 to an outlet box 18 disposed a short distance above the baseboard. This outlet box 18 is of such character that a plug may readily be inserted to make the electric connections for a movable desk light, an electric fan, or the like. A conduit 19 leads upwardly from the switch box 16 to the upper surface of the I-beam 10 in the ceiling. The conduit extends over the I-beam to the point at which it is probable that a lighting fixture will be required. Here the conduit turns downwardly and connects to an outlet box 20, the lower surface of which is exposed to view. If after the space has been rented, it is desirable that the lighting fixture be supported at some other point than at the outlet box 20, it is necessary to tear out the plastering, break away a portion of the fireproofing 12 and connect an extension 21 to the end of the conduit 19, by means of a coupling 22, as illustrated in Fig. 2. The extension 21 leads along the ceiling to the new points at which the lighting fixture is to be placed and there an outlet box 23 is installed and the ceiling is refinished.

In carrying out my invention, I do not install the ordinary outlet boxes 18 and 20, but in place thereof I employ a cap which closes the end of the conduit and which has an extension adapted to lead through the plastering and constitute a position indicator. In Figs. 3 and 4, I have illustrated one form of device which comprises a simple metal cap 24, interiorly threaded to fit the end of the conduit. Formed integral with the cap is an extension 25, which is very small in cross section, and, in fact, constitutes nothing more than a wire. This extension may be annealed, so that it may be readily bent at any desired angle; for instance, in Fig. 4, I have illustrated the extension bent to lie substantially at right angles to the general direction of the conduit. In Fig. 5, I have illustrated a very similar cap 26, which has an extension 27 formed of a separate piece of material attached to the cap rather than being formed integral with the cap. This extension 27 is in the form of a wire extending through an aperture in the end wall of the cap. This wire may have a head 28 in engagement with the inner surface of said end wall and may have a shoulder 29 struck up thereon to prevent the removal of the extension from the cap, or the shoulder 29 may be formed first and the head 28 formed after the extension has been placed in position in the aperture. I do not wish to be limited to the form of cap shown in Figs. 3 and 4, or the form shown in Fig. 5, as various changes may be made in the construction of the device without in any way departing from the spirit of my invention. In utilizing this cap and the extension, which latter constitutes the position indicator, I install the conduits in the same way as above described, only instead of placing the outlet boxes at the ends of the conduits, I employ my improved device.

At the left-hand side of Fig. 1, I have illustrated a similar system of conduits to that illustrated at the right-hand side, but I close the depending end of the conduit 19 by my improved cap. The extension 25 depends from the end of the cap and is of such length that after the ceiling has been plastered, the free end of the extension will terminate below the lower surface of the plaster. A cap is placed at the lower end of the conduit 17 but the extension from this cap is bent so as to extend out through the vertical surface of the plastering.

The original cost of the cap is far less than that of an outlet box, and the time and trouble involved in plastering around the extension 25 is far less than that required in plastering around an outlet box.

When the exact point has been determined at which the lighting fixture is to be placed, the outlet box may be installed at the end of a conduit extension, as illustrated in Fig. 2. In case it is not desired to use any lighting fixture at the end of the conduit, the extension 25, which serves to indicate the position of the end of the conduit, may be cut off flush with the surface and its presence will be almost imperceptible, unless a person be searching for the indicator. This avoids the necessity of closing an outlet box by a large plate, which is very conspicuous and unsightly.

Although my invention relates primarily to the installation of conduits for electric conductors, yet at the same sime it is obvious that my improved cap with its extension constituting a position indicator, may be employed in connection with gas pipes or in connection with any form of electric conductor having an outer casing, sheath or insulation, for instance, armored cables, flexible conduits, and the like.

In Fig. 6, I have illustrated the cap 24 applied to the end of a flexible conduit 30, having a sheath or casing of helically-disposed metal strips.

Having thus described my invention, I claim as new and desire to secure by Letters Patent:

1. An improvement in the art of building construction, which consists in incorporating within the wall of a building a tubular protecting casing for the electric conductors, placing at the terminal of said casing a position indicator, and applying a wall covering to conceal said casing and to leave exposed a portion of the indicator of smaller cross-sectional area than said casing.

2. An improvement in the art of building construction, which consists in incorporating within the wall of a building a pipe, placing at the terminal of said pipe, a position indicator, and applying a wall covering to conceal said conduit and to leave exposed a portion of the indicator of smaller cross-sectional area than said pipe.

3. An improvement in the art of building construction, which consists in incorporating within the wall of a building a conduit, placing at the terminal of said conduit a position indicator, and plastering over the conduit and indicator to leave a portion of the latter of small cross-sectional area exposed.

4. An improvement in the art of installing electric equipments in building, consisting in closing the free ends of the electric wire conduits, supporting an elongated indicator of small cross-sectional area adjacent each free end, and concealing the conduit, the closure and a portion of the indicator by plastering, a terminal portion of the position indicator being left exposed.

5. In combination, a conduit, a closure for the free end thereof, a position indicating member of smaller cross-sectional area than said conduit supported adjacent said free end, and a covering for said conduit and said closure, a portion of said member projecting beyond said covering and being exposed to view.

6. In combination, a protecting casing for electric conductors, a closure for the free end thereof, a position indicating member of smaller cross-sectional area than said casing supported adjacent said free end, and plastering covering said casing and said closure, a portion of said member projecting beyond said plastering and being exposed to view.

7. In combination, a conduit, a cap detachably secured to the free end thereof, a position indicating member of small cross-sectional area, supported adjacent said free end, and plastering covering said conduit and said cap, a portion of said member projecting beyond said plastering and being exposed to view.

8. In combination, an electric wire conduit, a closure for the free end thereof, a wire supported adjacent said free end, and plastering covering said conduit and said closure and a portion of said wire, the terminal of said wire extending through said plastering and being exposed to view.

9. In combination, an electric wire conduit, a closure for the free end thereof, said closure having an extension projecting therefrom, and a covering for said conduit and said closure, the free end of said extension being exposed to view.

10. In combination, an electric wire conduit, a cap detachably secured to the free end thereof for closing the same, said cap having an extension of small cross-sectional area, and plastering covering said conduit and said closure, the free end of said extension projecting through said plastering.

11. A device for closing the end of electric wire conduits, flexible conduits, armored cables and the like, and indicating the position of said closed end, comprising a cap having a projection of small cross-sectional area.

12. A device for closing the end of electric wire conduits, flexible conduits, armored cables and the like, and indicating the position of said closed end, comprising a cap having an elongated flexible projection of small cross-sectional area.

In testimony whereof I have signed my name to this specification in the presence of two subscribing witnesses.

EDWARD HALL FAILE.

Witnesses:
CLAIR W. FAIRBANKS,
JOHN P. DAVIS.